(12) United States Patent
Hoshi et al.

(10) Patent No.: US 12,306,202 B2
(45) Date of Patent: May 20, 2025

(54) CONVEYANCE DEVICE

(71) Applicant: Hitachi High-Tech Corporation, Tokyo (JP)

(72) Inventors: Ryosuke Hoshi, Tokyo (JP); Yasuaki Aoyama, Tokyo (JP); Akeshi Takahashi, Tokyo (JP); Satoru Kaneko, Tokyo (JP); Takeshi Tamakoshi, Tokyo (JP); Hiroyuki Kobayashi, Tokyo (JP); Hiroshi Watanabe, Tokyo (JP); Kuniaki Onizawa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 148 days.

(21) Appl. No.: 18/028,773

(22) PCT Filed: Aug. 27, 2021

(86) PCT No.: PCT/JP2021/031539
§ 371 (c)(1),
(2) Date: Mar. 28, 2023

(87) PCT Pub. No.: WO2022/091555
PCT Pub. Date: May 5, 2022

(65) Prior Publication Data
US 2023/0333131 A1 Oct. 19, 2023

(30) Foreign Application Priority Data
Oct. 27, 2020 (JP) ................................. 2020-179474

(51) Int. Cl.
*G01N 35/04* (2006.01)
*B65G 54/02* (2006.01)

(52) U.S. Cl.
CPC ............. *G01N 35/04* (2013.01); *B65G 54/02* (2013.01); *G01N 2035/0475* (2013.01); *G01N 2035/0477* (2013.01)

(58) Field of Classification Search
CPC ........... G01N 35/04; G01N 2035/0475; G01N 2035/0477; G01N 2035/0406;
(Continued)

(56) References Cited

U.S. PATENT DOCUMENTS 10,160,609 B2 * 12/2018 Malinowski ........... B65G 54/02
2004/0090129 A1 5/2004 Uchida
2016/0097786 A1 * 4/2016 Malinowski ........... G01N 35/00
422/67

FOREIGN PATENT DOCUMENTS

JP 59-28985 Y2 8/1984
JP H5928985 * 8/1984
(Continued)

OTHER PUBLICATIONS

International Search Report of PCT/JP2021/031539 dated Oct. 19, 2021.
(Continued)

*Primary Examiner* — Gene O Crawford
*Assistant Examiner* — Muhammad Awais
(74) *Attorney, Agent, or Firm* — MATTINGLY & MALUR, PC

(57) ABSTRACT

Provided is a conveyance device capable of reducing the weight of a conveyance device while preventing magnetic saturation. A conveyance device according to the present invention is characterized by comprising a conveyance path (65) in which a conveyed object is moved, an electromagnet provided on the surface of the conveyance path (65) opposite to the surface on which the conveyed object moves, and a drive circuit for supplying a current to the electromagnet, (Continued)

the electromagnet including teeth (22a, 22b) formed from a magnetic body, and windings (21a, 21b) wound onto the surface of the teeth (22a, 22b), a yoke (26) is provided that supports the teeth (22a, 22b), and the relationship between the minimum cross-sectional area Sy of the yoke (26) and the minimum cross-sectional area St of the part of the teeth (22a, 22b) where the windings (21a, 21b) are provided is Sy<St.

6 Claims, 10 Drawing Sheets

(58) Field of Classification Search
CPC ........ B65G 54/02; B65G 15/58; B65G 17/46; B65G 21/2018; H02K 41/031; H02K 1/14
USPC .............................................. 198/618, 502.3
See application file for complete search history.

(56) References Cited

FOREIGN PATENT DOCUMENTS

| | | | |
|---|---|---|---|
| JP | 60-110169 A | | 7/1985 |
| JP | H0116693 | * | 7/1985 |
| JP | 08-186018 A | | 7/1996 |
| JP | 09-174368 A | | 7/1997 |
| JP | 2004-153151 A | | 5/2004 |
| JP | 2016-075684 A | | 5/2016 |

OTHER PUBLICATIONS

International Preliminary Report of PCT/JP2021/031539 dated Mar. 1, 2022.
Japanese Office Action received in corresponding Japanese Application No. 2020-179474 dated Sep. 3, 2024.

* cited by examiner

[FIG. 1]
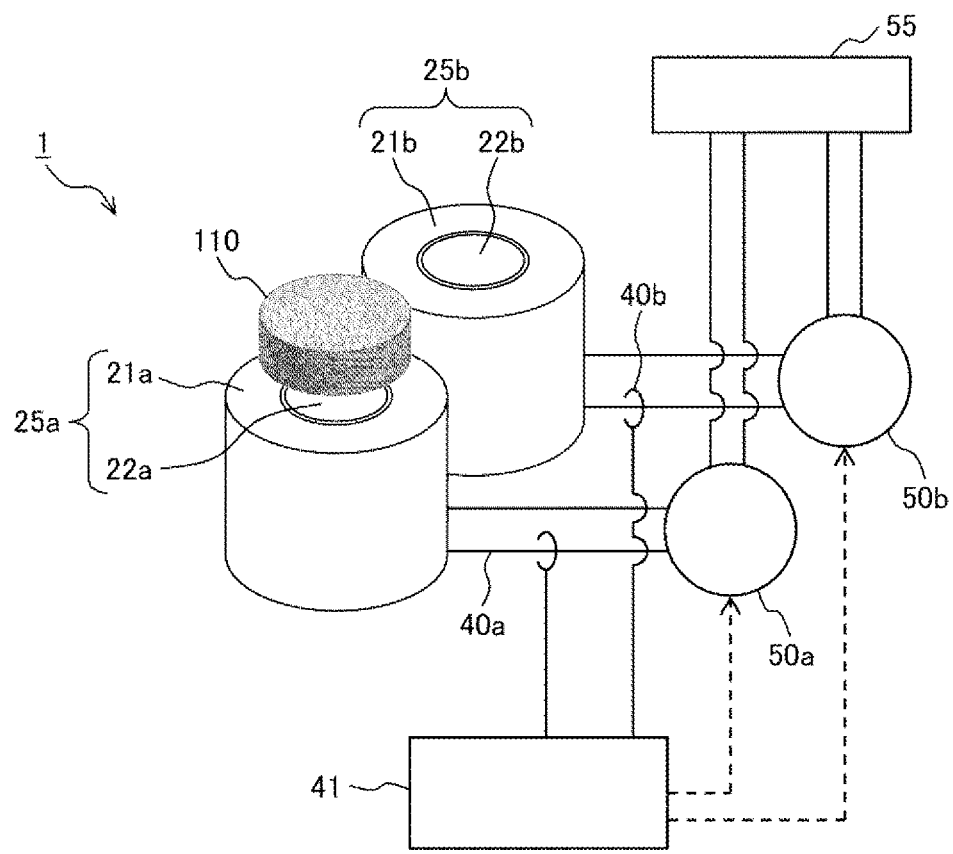

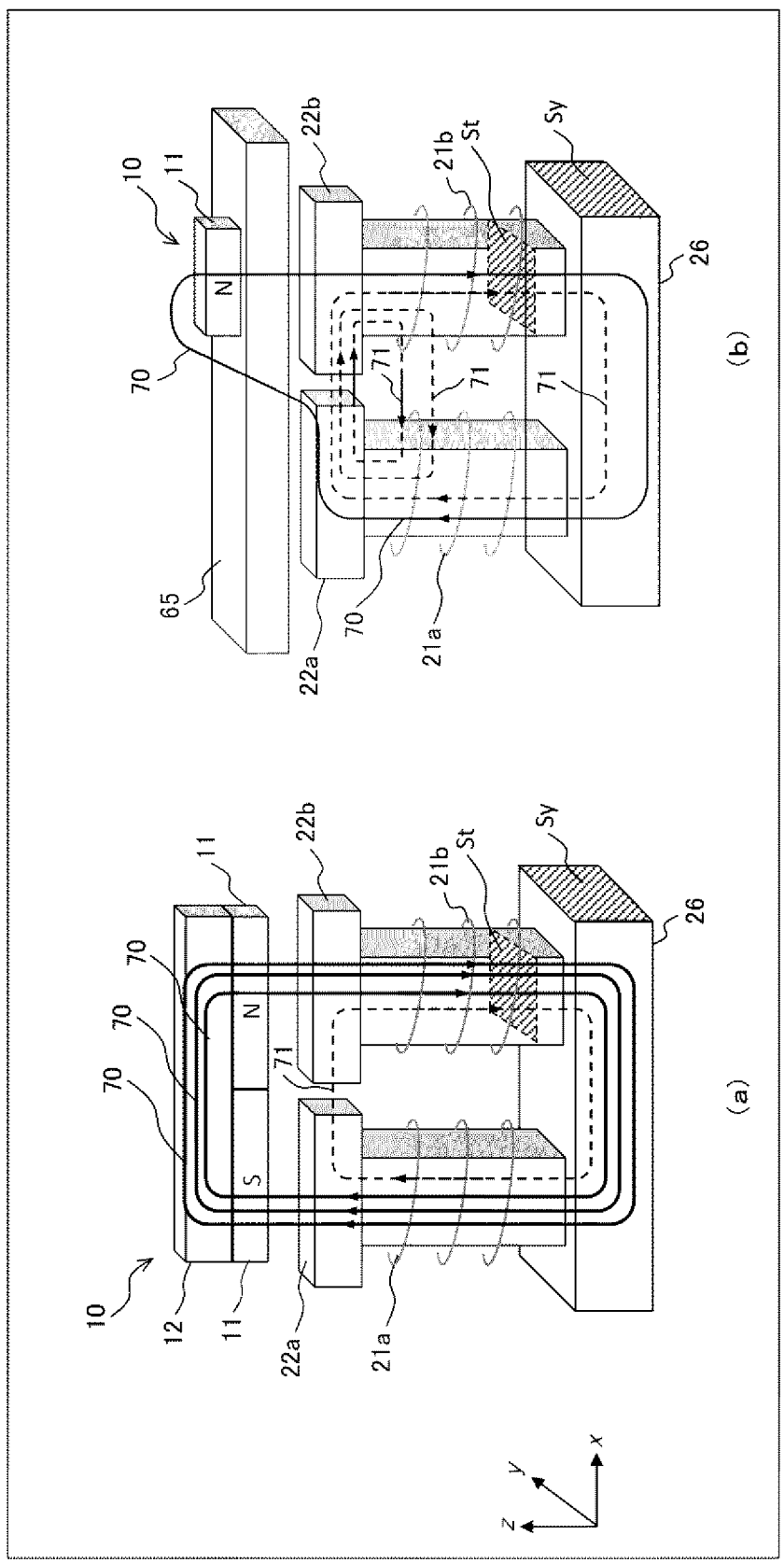

[FIG. 3]
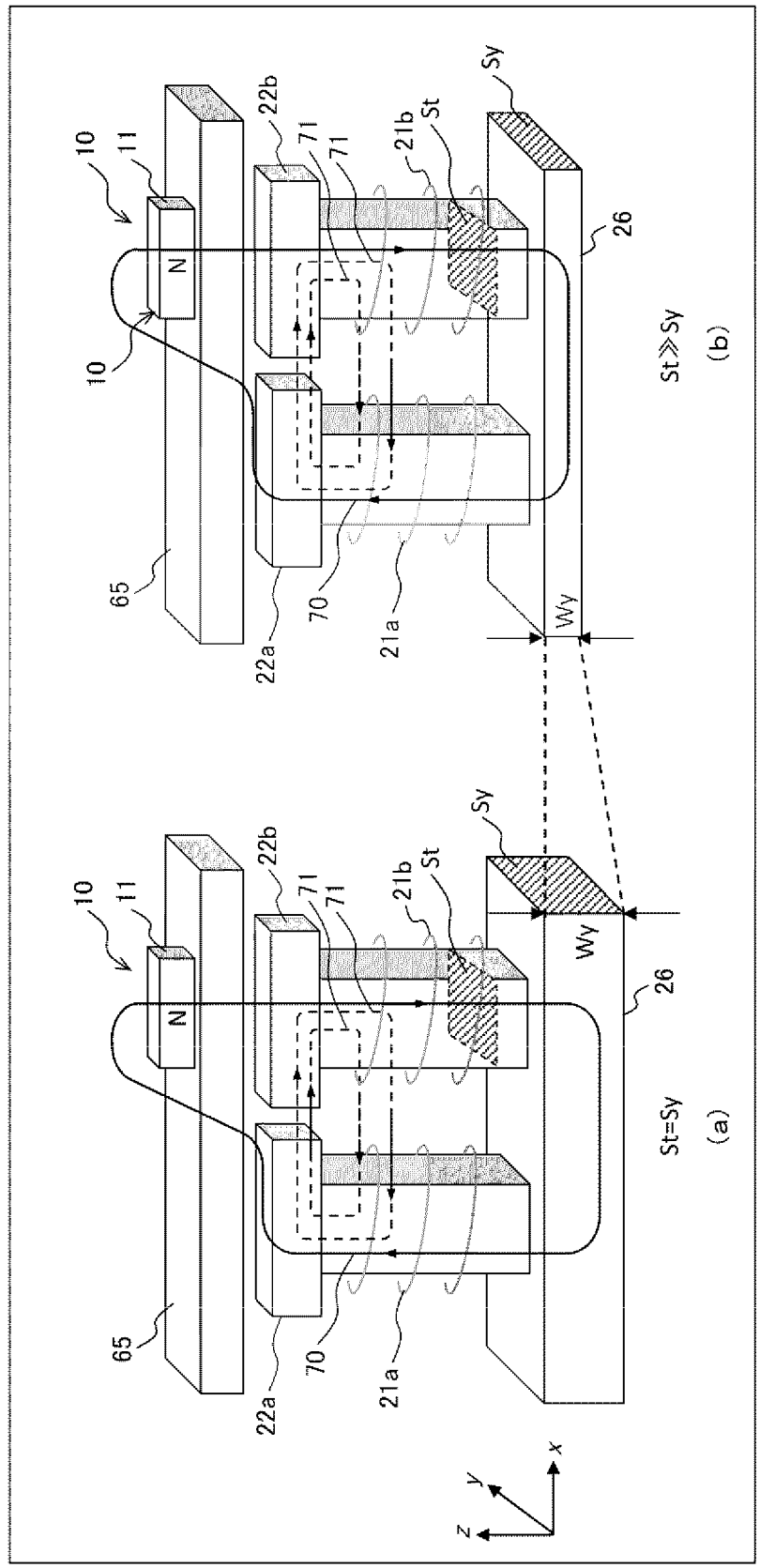

[FIG. 4]
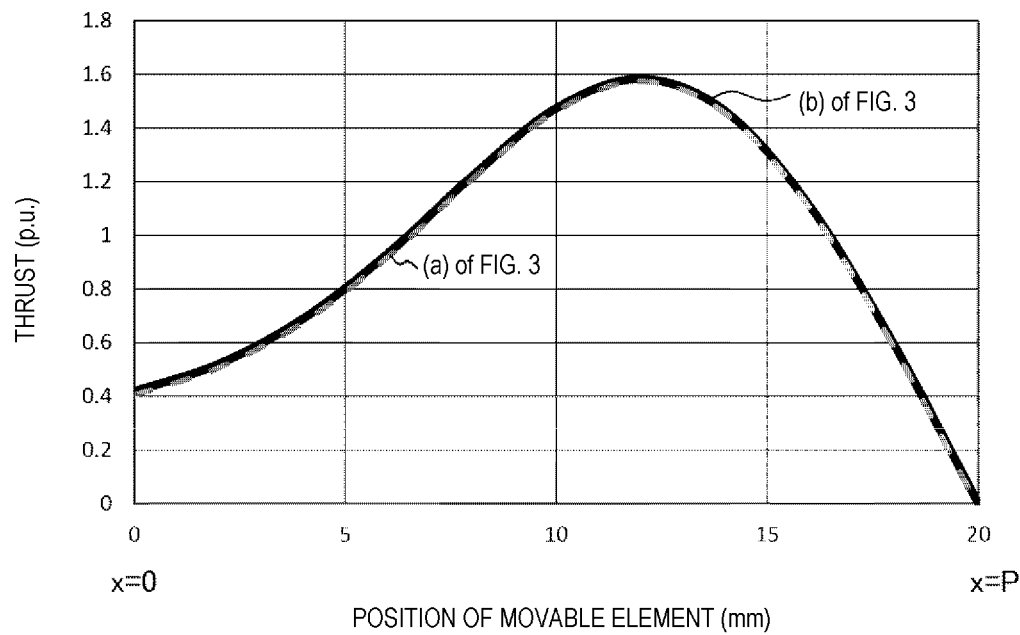

[FIG. 5]
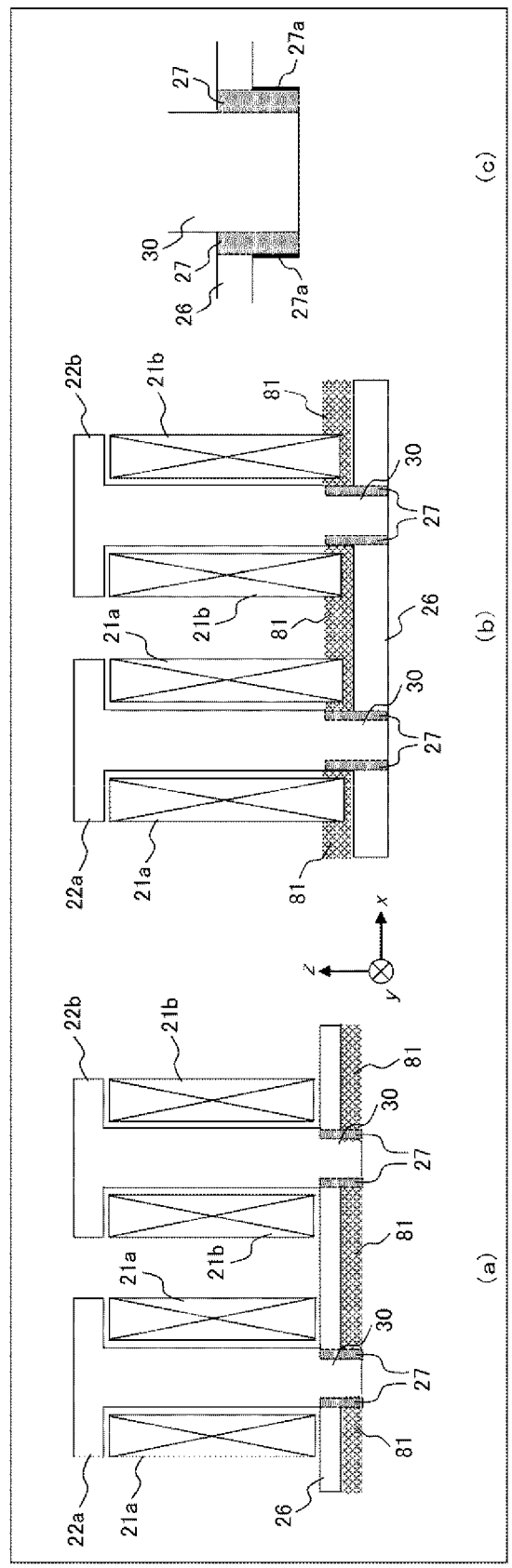

[FIG. 6]
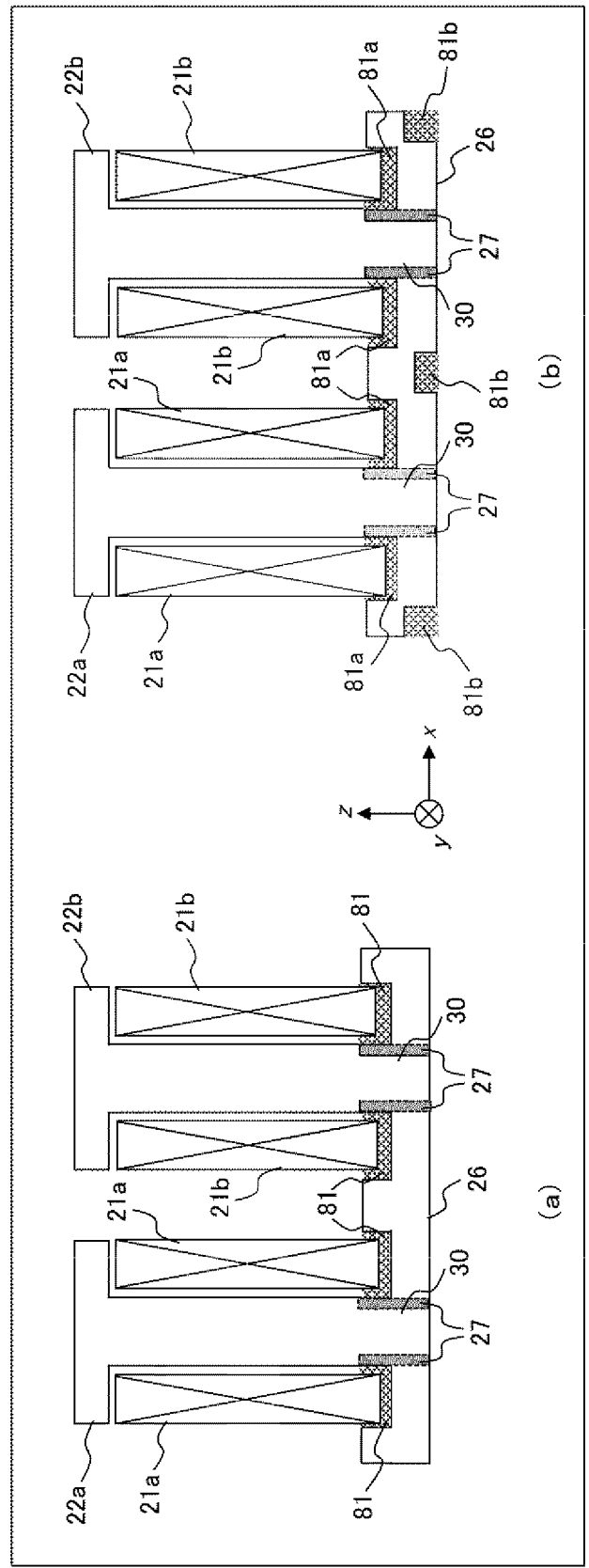

[FIG. 7]
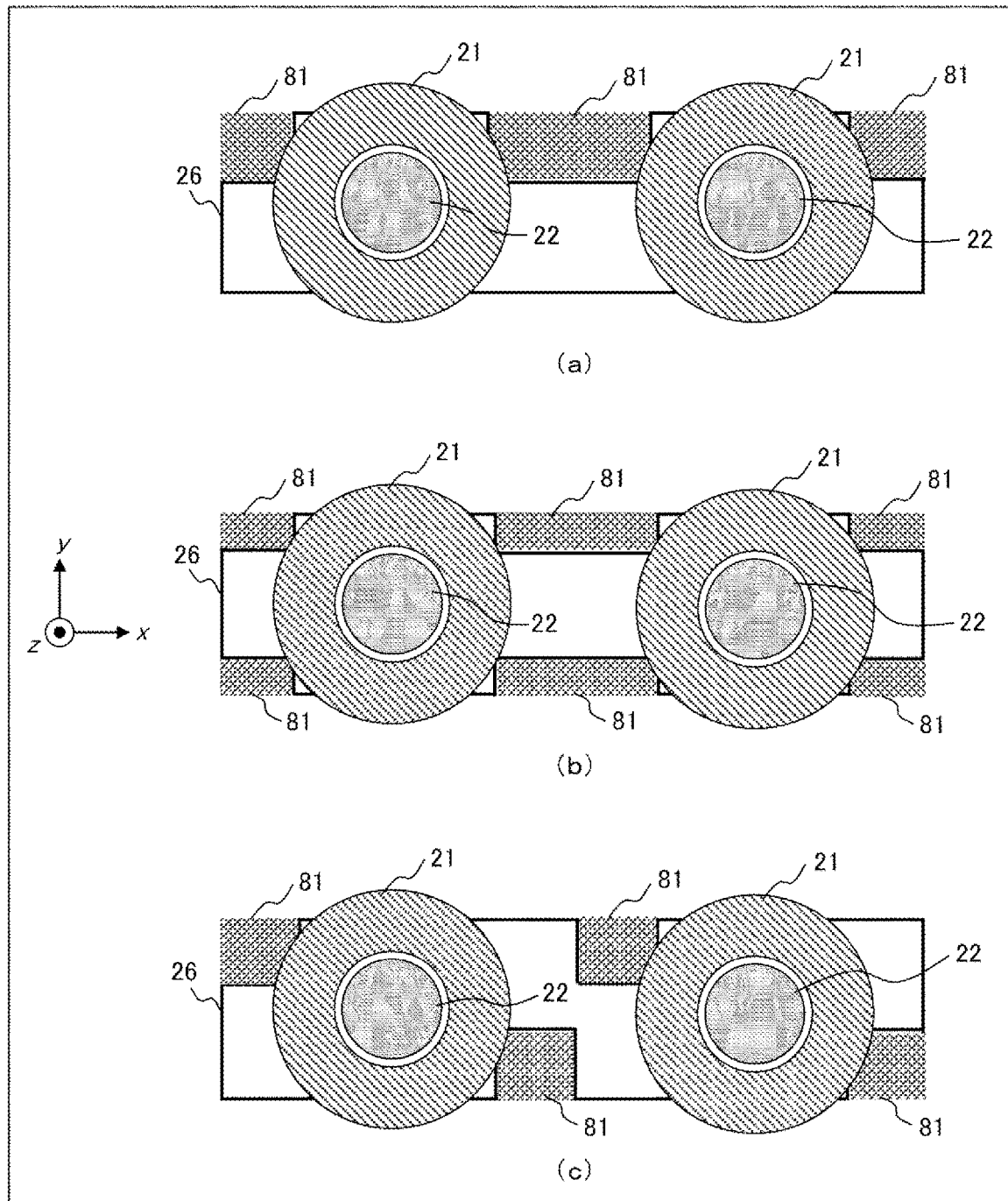

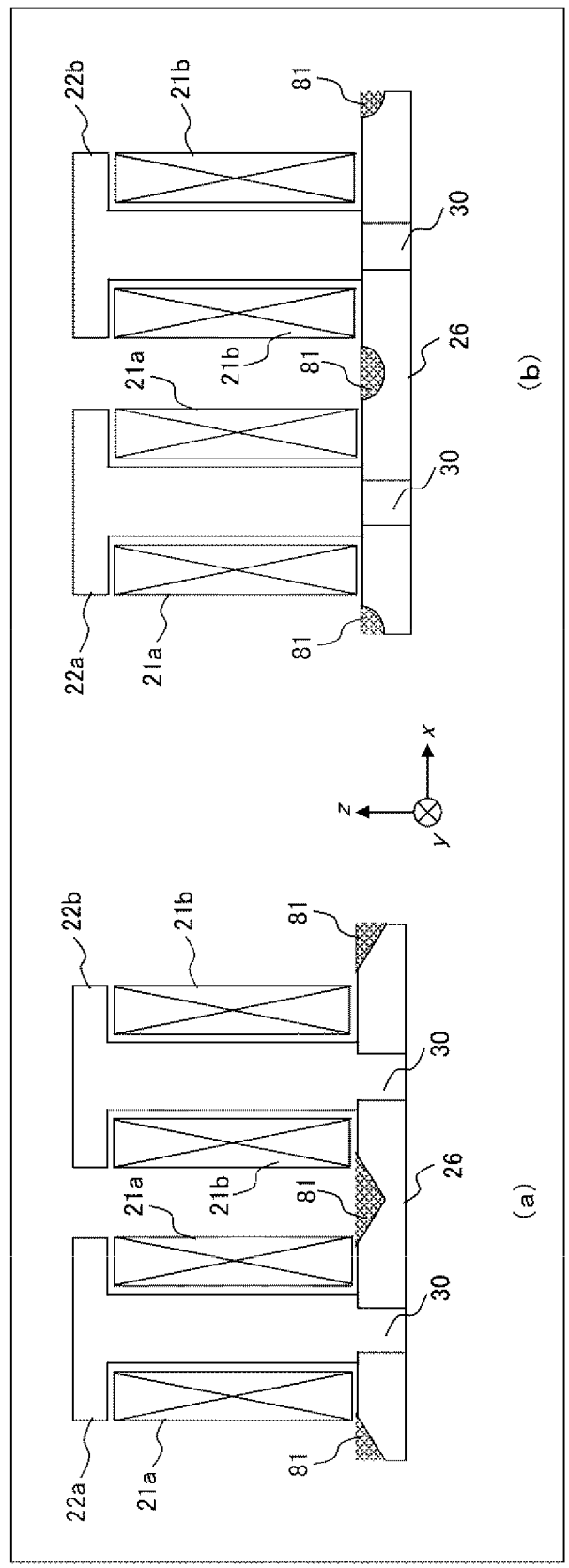
[FIG. 8]

[FIG. 9]
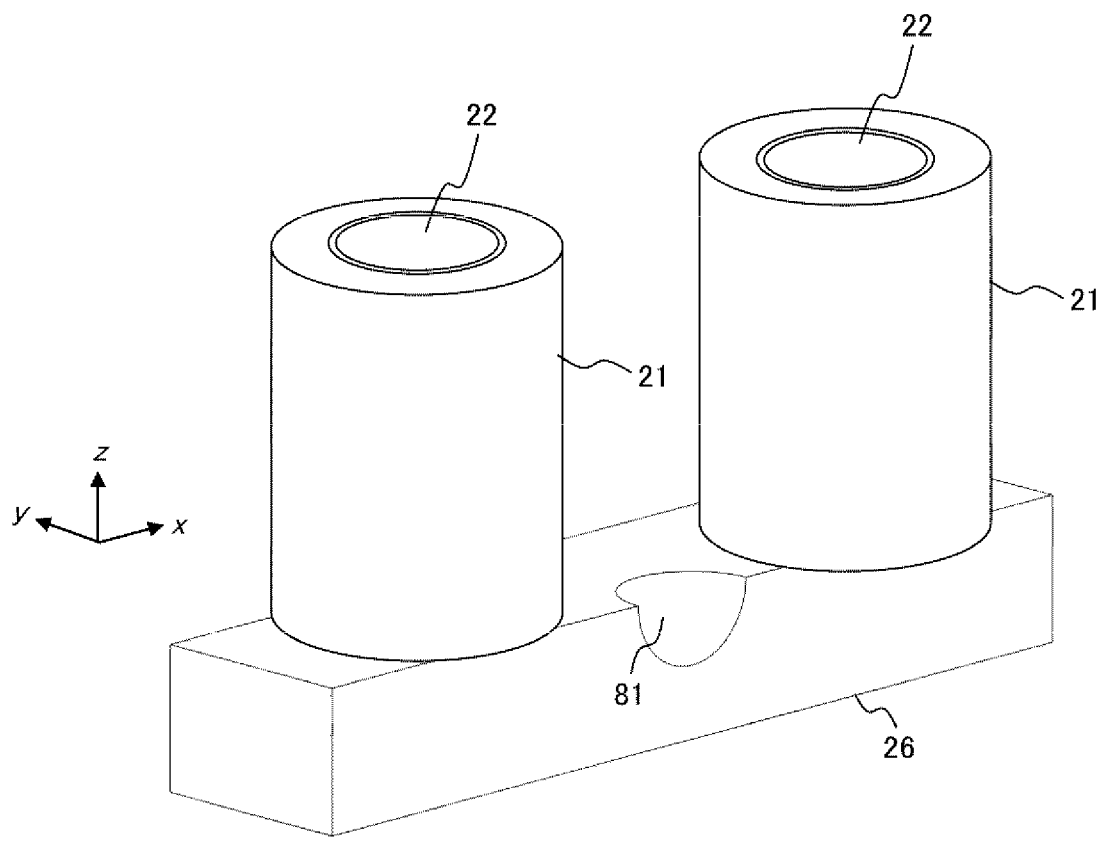

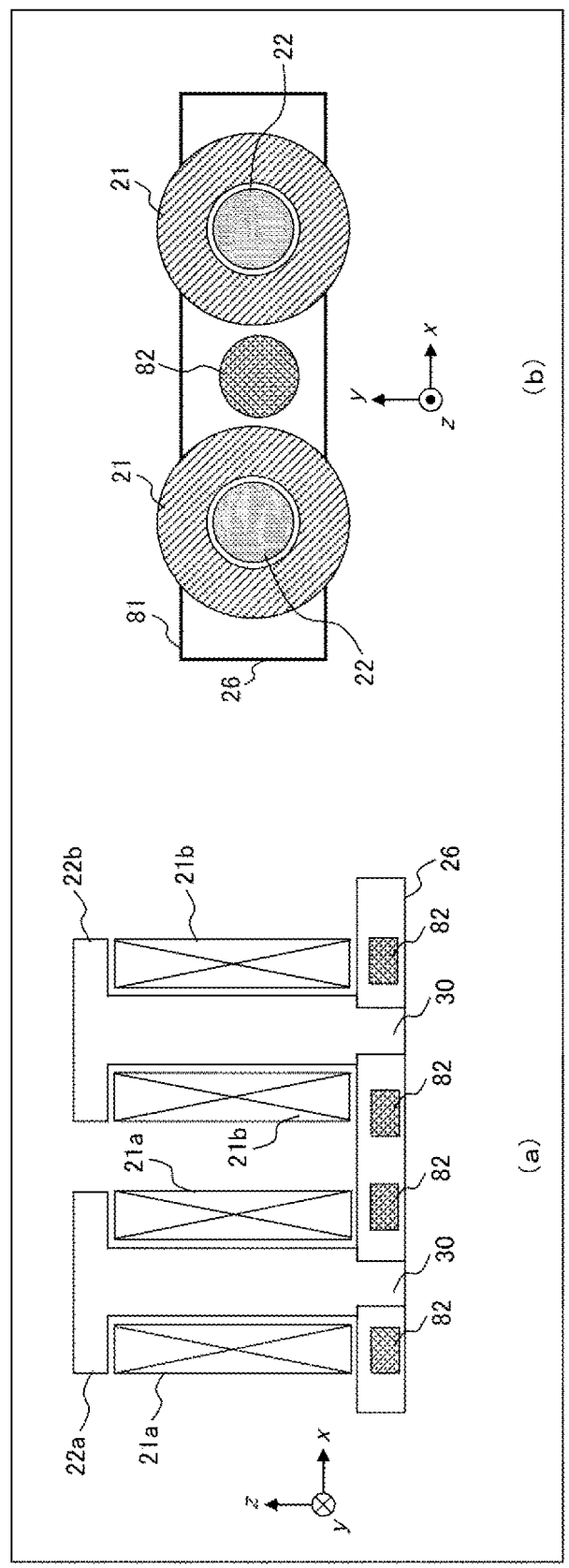
[FIG. 10]

CONVEYANCE DEVICE

TECHNICAL FIELD

The present invention relates to a conveyance device.

BACKGROUND ART

In a specimen analysis system that analyzes a biological sample (hereinafter referred to as "sample".) such as blood, plasma, serum, urine, and other body fluids, devices having a plurality of functions are connected to each other and steps are automatically processed in order to inspect instructed analysis items for each specimen. In other words, in the specimen analysis system, analysis units in a plurality of analysis fields such as biochemistry and immunization are connected by a conveyance line, and a plurality of analyses are collectively performed.

A conveyance method of the conveyance line includes (1) a method of using a belt conveyor and (2) a method of using an electromagnetic attraction force as thrust. In recent years, in order to improve analytical processing capabilities of a specimen analysis system, it is desirable to achieve high-speed conveyance, mass simultaneous conveyance, and conveyance in a plurality of directions of a specimen, and in this point, the method (2) of using an electromagnetic attraction force as thrust as described above is more advantageous than the method (1) of using a belt conveyor as described above, and development thereof has been advanced.

In the method (2), a permanent magnet is provided on a container carrier such as a holder that holds a specimen, and an electromagnetic attraction force generated by supplying a current to a winding wire of a magnetic circuit provided on a transfer surface is used as thrust of the container carrier. The magnetic circuit includes teeth disposed in a grid pattern and a yoke that connects the teeth to each other. An attempt is also made to form the teeth and the yoke in an integrated shape.

For example, PTL 1 discloses that a magnetic circuit is formed in which teeth are disposed in a grid pattern while improving magnetic coupling by integrating the teeth and a yoke and respectively fitting protruding portions and recessed portions of the magnetic circuit having different shapes. In the magnetic circuit, the protruding portions or the recessed portions are provided in the yoke.

CITATION LIST

Patent Literature

PTL 1: JP2016-075684A

SUMMARY OF INVENTION

Technical Problem

However, according to design rules in the related art, since cross-sectional areas of the teeth and the yoke are set to be equal to each other, there are problems in PTL 1 that the cross-sectional area of the yoke is increased to be equal to or greater than a minimum limit at which magnetic saturation does not occur, and that a weight of a conveyance device increases.

In view of the above circumstances, an object of the invention is to provide a conveyance device capable of preventing magnetic saturation with a reduced weight of the conveyance device.

Solution to Problem

An aspect of the invention provides a conveyance device including: a conveyance path on which a conveyed object moves; an electromagnet provided on a surface opposite to a surface of the conveyance path on which the conveyed object moves; and a drive circuit configured to cause a current to flow through the electromagnet, in which the electromagnet includes a tooth formed of a magnetic body and a winding wire wound around a surface of the tooth, a yoke that supports the tooth is provided, and a relationship between a minimum cross-sectional area $S_y$ of the yoke 26 and a minimum cross-sectional area $S_t$ of a portion of the tooth provided with the winding wire is $S_y < S_t$.

A more specific configuration according to the invention is described in the claims.

Advantageous Effects of Invention

According to the invention, it is possible to provide a conveyance device capable of preventing magnetic saturation with a reduced weight of the conveyance device.

Problems, configurations, and effects other than those described above will be clarified according to the following description of embodiments.

BRIEF DESCRIPTION OF DRAWINGS

FIG. 1 is a schematic configuration diagram showing an example of a conveyance device according to the invention.

FIG. 2 is a schematic cross-sectional view for comparison between configurations of conveyance devices.

FIG. 3 is a schematic cross-sectional view showing a case in which $S_t = S_y$ and a case in which $S_y < S_t$ in the conveyance device.

FIG. 4 is a graph showing thrust at positions of a movable element in (a) of FIG. 3 and (b) of FIG. 3.

FIG. 5 is a schematic cross-sectional view showing a first example of a conveyance device according to a second embodiment.

FIG. 6 is a schematic cross-sectional view showing a second example of the conveyance device according to the second embodiment.

FIG. 7 is a schematic cross-sectional view showing a conveyance device according to a third embodiment.

FIG. 8 is a schematic diagram showing a first example of a conveyance device according to a fourth embodiment.

FIG. 9 is a schematic diagram showing a second example of the conveyance device according to the fourth embodiment.

FIG. 10 is a schematic cross-sectional view of a conveyance device according to a fifth embodiment.

DESCRIPTION OF EMBODIMENTS

Hereinafter, embodiments of the invention will be described with reference to the drawings. The invention is not limited to the embodiments, and a desired function and effect according to the invention may be attained even though a shape, disposition, or other configurations are changed.

First Embodiment

FIG. 1 is a schematic configuration diagram showing an example of a conveyance device according to the invention. A conveyance device 1 according to the invention includes a conveyance path (not shown) on which a conveyed object 110 moves, electromagnets 25a and 25b provided on a surface opposite to a surface of the conveyance path on which the conveyed object moves, and drive circuits 50a and 50b that cause currents to flow through the electromagnets 25a and 25b. A power supply 55 is connected to the drive circuits 50a and 50b. Current detection units 40a and 40b are provided between the electromagnets 25a and 25b and the drive circuits 50a and 50b, and each of the current detection units 40a and 40b is connected to a calculation unit 41. Hereinafter, configurations will be described in detail.

A permanent magnet (not shown) is built in a bottom surface of the conveyed object 110. The conveyance path (not shown) is between the conveyed object 110 and the electromagnets 25a and 25b, and the conveyed object 110 slides and moves on the conveyance path.

Examples of the conveyed object 110 include a specimen holder that holds a specimen container such as a test tube and a sample cell containing a liquid specimen or a reagent one by one, and a specimen rack that holds a plurality of specimen containers. As the permanent magnet provided in the conveyed object 110, a neodymium alloy, ferrite, or the like is preferably used. In some cases, a soft magnetic body or the like may be used instead of the permanent magnet.

The electromagnets 25a and 25b include teeth 22a and 22b formed of a magnetic body, and winding wires 21a and 21b wound around outer peripheral portions of the teeth 22a and 22b. In FIG. 1, the teeth 22a and 22b have a cylindrical shape, and the invention is not limited thereto. Alternatively, the teeth 22a and 22b may have a prismatic shape.

The winding wires 21a and 21b of the electromagnets 25a and 25b are respectively connected to the drive circuits 50a and 50b. The electromagnets 25a and 25b generate magnetic fields by voltages applied by the drive circuits 50a and 50b, respectively. The magnetic fields are generated upward from upper end portions of the teeth 22a and 22b. With these magnetic fields, thrust is generated by the permanent magnet in the conveyed object 110.

The current detection units 40a and 40b have a function of respectively detecting currents flowing through the winding wires 21a and 21b of the electromagnets 25a and 25b, and sending current values of the currents to the calculation unit 41. The calculation unit 41 outputs a control signal that causes the conveyed object 110 to move using the detected current values or the like. Accordingly, the conveyed object 110 can be conveyed to a desired position. The current detection units 40a and 40b can use a member that measures a voltage of a series resistor, a member based on a current transformer, a member that uses a Hall-current sensor, or the like, and is not limited thereto.

The calculation unit 41 calculates a relative positional relationship between the teeth 22a and 22b and the conveyed object 110 based on the current values and the like detected by the current detection units 40a and 40b, and calculates a position of the conveyed object 110 in the conveyance device 1. In addition, the calculation unit 41 determines the amount of current necessary for driving the conveyed object 110 and a timing of supplying the current using the calculated position information of the conveyed object 110.

The power supply 55 is connected to the drive circuits 50a and 50b. The power supply 55 may supply an alternating current or a direct current. In the case of direct current, a battery may be used.

Next, an example of a moving device using an electromagnetic force as described above will be described. FIG. 2 is a schematic cross-sectional view for comparison between configurations of conveyance devices. With reference to FIG. 2, the description will be given by comparison between a configuration ((a) of FIG. 2) of a conveyance device of a rotating machine or a linear motor as a conveyance device other than the conveyance device used for analysis and a configuration ((b) of FIG. 2) of the conveyance device according to the invention used for analysis. The rotating machine or the linear motor as shown in (a) of FIG. 2 includes a stator 20 and a movable element 10. The stator 20 includes the teeth 22a and 22b, the winding wires 21a and 21b wound around the teeth 22a and 22b, and a yoke 26 that supports the teeth 22a and 22b. The movable element 10 includes a plurality of permanent magnets 11 having different polarities, and a movable element core 12 in contact with the permanent magnets 11.

Since the movable element 10 is close to the teeth 22a and 22b and the movable element core 12 is positioned on the movable element 10 in a manner of crossing over the teeth 22a and 22b, most of the generated magnetic flux becomes main magnetic flux 70 that forms loops between the teeth 22a, the teeth 22b, and the yoke 26 and the movable element 10. Therefore, the amount of magnetic flux passing through the teeth 22a and 22b is equal to the amount of magnetic flux passing through the yoke 26 due to a fact that leakage magnetic flux between the teeth 22a and the teeth 22b adjacent to each other is fairly small. Therefore, in order to prevent a decrease in electromagnetic force for driving the movable element 10 due to magnetic saturation of one of the teeth 22a and 22b or the yoke 26, it is necessary to make a cross-sectional area St of portions of the teeth 22a and 22b around which the winding wires are wound equal to a cross-sectional area Sy of the yoke.

Meanwhile, in a magnetic circuit of the conveyance device as shown in (b) of FIG. 2, since a conveyance path 65 (non-magnetic body) is interposed between the teeth 22a and 22b and the movable element 10, a distance between the teeth 22a and 22b and the movable element 10 is large. Therefore, leakage magnetic flux 71 between the teeth 22a and the teeth 22b adjacent to each other is larger than that in the rotating machine or the linear motor, or the like in (a) of FIG. 2, and the amount of magnetic flux passing through the yoke 26 is smaller than the amount of magnetic flux passing through the teeth 22a and 22b. Therefore, even though a minimum cross-sectional area Sy of the yoke 26 is made smaller than the cross-sectional area St of the teeth 22a and 22b, the electromagnetic force generated by the main magnetic flux 70 is not affected. Therefore, the cross-sectional area of the yoke 26 can be reduced within a range in which the magnetic saturation does not occur.

FIG. 3 is a schematic cross-sectional view showing a case in which St=Sy and a case in which Sy<St in the conveyance device. In contrast to Sy=St in (a) of FIG. 3, the cross-sectional area Sy of the yoke in (b) of FIG. 3 is reduced by reducing a thickness (yoke thickness Wy) of the yoke 26 in a z-axis direction. FIG. 4 is a graph showing thrust at positions of the movable element in (a) of FIG. 3 and (b) of FIG. 3. In FIG. 4, x=0 (mm) is set immediately above the teeth 22a, and x=P (mm) is set immediately above the teeth 22b. As shown in FIG. 4, since thrust characteristics in the case of Sy=St in (a) of FIG. 3 and thrust characteristics in the case of Sy<St in (b) of FIG. 3 match with each other, it can be seen that the main magnetic flux 70 is not affected even though the yoke 26 is thinned. Therefore, by satisfying Sy<St, it is possible to reduce a weight of the yoke 26, which is one of members that form the magnetic circuit. Material costs can be reduced and manufacturing costs can be reduced by reducing the weight of the yoke 26. Further, a size of the conveyance device can be reduced by reducing the weight of the yoke 26.

Second Embodiment

FIG. 5 is a schematic cross-sectional view showing a first example of a conveyance device according to a second embodiment. In the first embodiment, the yoke thickness Wy is reduced to satisfy Sy<St, but in the present embodiment, as shown in (a) of FIG. 5 and (b) of FIG. 5, a cross-sectional area of the yoke is locally narrowed by forming recessed portions 81 in a manner of avoiding a portion at which strength is required to satisfy Sy<St. In (a) of FIG. 5, the recessed portions 81 are formed on a bottom surface side (a surface opposite to a surface on which the teeth 22a and 22b are placed) of the yoke 26, and in (b) of FIG. 5, the recessed portions 81 are formed on an upper surface side (a surface opposite to a surface on which the teeth 22a and 22b are placed) of the yoke 26. That is, by forming the recessed portions 81, the yoke 26 is opened in a z-axis negative direction in (a) of FIG. 5 and in a z-axis positive direction in (b) of FIG. 5. In both cases, the recessed portions 81 of the yoke 26 are formed such that a relationship between the minimum cross-sectional area Sy of the yoke 26 and a minimum cross-sectional area St of the teeth 22a and 22b satisfies Sy<St.

Since the recessed portions 81 are formed in a manner of avoiding teeth base portions 27, which are connection portions between the teeth 22a and 22b and the yoke 26, it is possible to reduce the cross-sectional area and a weight of the yoke 26 while securing strength of the teeth base portions 27. The teeth base portions 27 of the yoke come into contact with teeth mounting portions 30 by press fitting by a gap clearance or tapping, so that the teeth 22a and 22b are fixed to the yoke 26, and the teeth 22a and 22b and the yoke 26 are magnetically coupled.

In (a) of FIG. 5, a surface area of the yoke 26 on the z-axis negative direction side increases by an amount corresponding to a teeth base portion surface 27a as shown in (c) of FIG. 5, which is an enlarged view of a part of (a) of FIG. 5. Therefore, by providing a fan on the z-axis negative direction side, an improvement in cooling efficiency of the magnetic circuit can be expected. Further, in (b) of FIG. 5, since the recessed portions 81 are opened in the z-axis positive direction, a portion provided with the recessed portion 81 can be used as a space for providing a winding wire 21. Therefore, it is possible to increase the winding number of turns of the winding wire 21 without changing dimensions of the teeth 22a and 22b, and to increase an electromagnetic force for driving the movable element 10.

FIG. 6 is a schematic cross-sectional view showing a second example of the conveyance device according to the second embodiment. In (a) of FIG. 6, two recessed portions 81 are formed on the upper surface of the yoke 26 in a manner of avoiding the teeth base portions 27 and the winding wires 21a and 21b. When the conveyance device has a structure in which a force is applied to a part of the yoke 26, each recessed portion 81 is formed in a portion other than the portion at which strength is required, so that the strength can be secured while reducing the weight.

(b) of FIG. 6 shows a mode in which both recessed portions 81a formed on the upper surface of the yoke 26 and recessed portions 81b formed on the bottom surface of the yoke 26 are formed. As shown in (b) of FIG. 6, both of the recessed portions formed on the upper surface and the bottom surface of the yoke 26 may be formed in combination.

Third Embodiment

FIG. 7 is a schematic cross-sectional view showing a conveyance device according to a third embodiment. FIG. 7 is a view of a magnetic circuit when viewed from a z-axis positive direction. As shown in FIG. 7, in the present embodiment, the recessed portions 81 are formed on a side surface (horizontal direction (x-axis direction or y-axis direction)) of the yoke 26. In FIG. 7, by forming the recessed portions 81 in the horizontal direction so as to satisfy Sy<St, the same effect as that according to the first embodiment can be attained.

In (a) of FIG. 7, the recessed portions 81 are opened in a y-axis positive direction so as to satisfy Sy<St, but a manner of forming the recessed portions 81 is not limited thereto. For example, as shown in (b) of FIG. 7, the recessed portions 81 opened in the y-axis positive direction and the recessed portions 81 opened in a y-axis negative direction may be formed in combination to satisfy Sy<St. In addition, the recessed portions 81 may be alternately formed as shown in (c) of FIG. 7. In the embodiment in (c) of FIG. 7, by forming the recessed portions 81 to avoid teeth base portions, it is possible to reduce Sy while securing strength of the teeth base portions.

Fourth Embodiment

FIG. 8 is a schematic cross-sectional view showing a first example of a conveyance device according to a third embodiment, and FIG. 9 is a schematic diagram showing a second example of the conveyance device according to the fourth embodiment. A shape of a recessed portion is not limited to the shape in the second embodiment or the third embodiment. FIGS. 8 and 9 show examples of the shape of the recessed portion. The recessed portion may be a recessed portion having a triangular cross section as shown in (a) of FIG. 8 or a recessed portion having a semicircular cross section as shown in (b) of FIG. 8. In addition, as shown in FIG. 9, the recessed portion may be opened in both a vertical direction (z-axis direction) and a horizontal direction (either an x-axis direction or a y-axis direction).

Fifth Embodiment

FIG. 10 is a schematic cross-sectional view of a conveyance device according to a fifth embodiment. In the present embodiment, the yoke 26 is formed with holes 82 instead of the recessed portions 81. The holes 82 are formed inside the yoke and do not have openings like the recessed portions 81. By forming the holes in the yoke 26 so as to satisfy Sy<St, the same effect as that according to the first embodiment can be attained. The number of holes 82 may be one or more. A cross-sectional shape of each hole 82 may be a circle or a quadrangle, and is not limited thereto.

As described above, it is shown that the invention can provide a conveyance device capable of preventing magnetic saturation with a reduced weight of the conveyance device. The invention is suitable for a specimen analysis system, a specimen pretreatment device that performs pretreatment necessary for analysis, and the like.

The invention is not limited to the embodiments described above and includes various modifications.

The embodiments described above are described in detail for easy understanding of the invention, and the invention is not necessarily limited to those including all the configurations described above.

A part of a configuration according to one embodiment can be replaced with a configuration according to another embodiment, and a configuration according to one embodiment can also be added to a configuration according to another embodiment. A part of a configuration according to each embodiment may be added, deleted, or replaced with another configuration.

REFERENCE SIGNS LIST

1: conveyance device
10: movable element
11: permanent magnet
12: movable element core
20: stator
21, 21a, 21b: winding wire
22, 22a, 22b: teeth (second ferromagnetic body)
25, 25a, 25b: electromagnet
26: yoke
27: teeth base portion of yoke
27a: teeth base portion surface
28: cross section of teeth
29: cross section of yoke
30: teeth mounting portion
40: current detection unit
41: calculation unit
50: drive circuit
55: power supply
60: position or speed detection unit
65: conveyance path
70: main magnetic flux
71: leakage magnetic flux
81, 81a, 81b: recessed portion formed in yoke
82: hole formed in yoke
110: conveyed object

The invention claimed is:

1. A conveyance device comprising:
a conveyance path made of a non-magnetic material on which a conveyed object made of a non-magnetic material and having a permanent magnet or a soft magnetic material incorporated therein slides and moves;
an electromagnet provided on a surface opposite to a surface of the conveyance path on which the conveyed object moves; and
a drive circuit configured to cause a current to flow through the electromagnet, wherein
the electromagnet includes a plurality of teeth formed of a magnetic body and a winding wire wound around surfaces of the teeth, and
a yoke that supports the teeth is provided, an amount of magnetic flux passing through the yoke immediately below a pair of teeth is smaller than an amount of magnetic flux passing along the pair of teeth adjacent to each other among the plurality of teeth, and a relationship between a minimum cross-sectional area $S_y$ of the yoke and a minimum cross-sectional area $S_t$ of a portion of the teeth provided with the winding wire is $S_y < S_t$.

2. The conveyance device according to claim 1, wherein at least one recessed portion is formed in the yoke, and a minimum cross-sectional area of at least one portion formed with the recessed portion is the minimum cross-sectional area $S_y$ of the yoke.

3. The conveyance device according to claim 2, wherein the recessed portion is formed on an upper surface or a bottom surface of the yoke.

4. The conveyance device according to claim 2, wherein the recessed portion is formed on a side surface of the yoke.

5. The conveyance device according to claim 2, wherein the recessed portion is opened toward the upper surface, the bottom surface, or the side surface of the yoke.

6. The conveyance device according to claim 1, wherein at least one hole is formed in the yoke.

* * * * *